(12) United States Patent
Goto et al.

(10) Patent No.: US 8,404,066 B2
(45) Date of Patent: Mar. 26, 2013

(54) THIN HIGH-PERFORMANCE POLARIZING FILM AND METHOD FOR MANUFACTURING THE SAME

(75) Inventors: Shusaku Goto, Ibaraki (JP); Minoru Miyatake, Ibaraki (JP); Tomohiro Mori, Ibaraki (JP); Kentaro Yoshida, Ibaraki (JP); Takeharu Kitagawa, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 7 days.

(21) Appl. No.: 13/225,347

(22) Filed: Sep. 2, 2011

(65) Prior Publication Data

US 2011/0315306 A1  Dec. 29, 2011

Related U.S. Application Data

(63) Continuation of application No. PCT/JP2010/001460, filed on Mar. 3, 2010.

(30) Foreign Application Priority Data

Mar. 5, 2009  (JP) ................................. 2009-051775

(51) Int. Cl.
    *B32B 38/10* (2006.01)
(52) U.S. Cl. .......................... 156/229; 156/242; 156/246
(58) Field of Classification Search .................. 156/229, 156/242, 246
    See application file for complete search history.

(56) References Cited

U.S. PATENT DOCUMENTS

| 2003/0137732 A1 | 7/2003 | Sugino et al. |
| 2004/0001169 A1 | 1/2004 | Saiki et al. |
| 2007/0264446 A1 | 11/2007 | Otoshi et al. |

FOREIGN PATENT DOCUMENTS

| JP | 51-069644 | 6/1976 |
| JP | 2000-338329 | * 12/2000 |
| JP | 2001-343521 | 12/2001 |
| JP | 2005-266325 | * 9/2005 |
| JP | 4279944 | 3/2009 |

OTHER PUBLICATIONS

International Search Report and written opinion mailed Apr. 13, 2010 for PCT/JP2010/001460.
Supplementary European Search Report for EP10748516 dated Jul. 31, 2012.

* cited by examiner

*Primary Examiner* — Katarzyna Wyrozebski Lee
*Assistant Examiner* — John Blades
(74) *Attorney, Agent, or Firm* — Lowe Hauptman Ham & Berner, LLP (57) ABSTRACT

A method for manufacturing a thin high-performance polarizing film includes coating a polyvinyl alcohol type resin on a resin substrate having a thickness of at least 20 μm and then drying the resin to thereby form a polyvinyl alcohol type resin layer, immersing thus produced polyvinyl alcohol type resin layer in a dyeing solution including a dichroic material to thereby have the dichroic material impregnated in the polyvinyl alcohol type resin layer, stretching the polyvinyl alcohol type resin layer having the dichroic material impregnated therein together with the resin substrate in a boric acid solution such that a total stretching ratio of 5.0 or more of the original length is achieved.

19 Claims, 6 Drawing Sheets

| | STRETCHING METHOD | SUBSTRATE | MAXIMUM STRETCHING RATIO (STRETCHING RATIO JUST BEFORE BREAKING) | STRETCHING TEMPERATURE (°C) | TRANSMITTANCE (%) | POLARIZATION RATE (%) |
|---|---|---|---|---|---|---|
| EXAMPLE 1 | WET | NON-CRYSTALLIZED POLYETHYLENE TEREPHTHALATE (PET) GLASS-TRANSITION TEMPERATURE 80°C | 5.0 | 60 | 42.4 | 99.95 |
| EXAMPLE 2 | WET | POLYMETHYL PENTENE (PMP) GLASS-TRANSITION TEMPERATURE 30°C | 5.5 | 60 | 42.5 | 99.99 |
| COMP. TEST SAMPLE 1 | DRY | NON-CRYSTALLIZED POLYETHYLENE TEREPHTHALATE (PET) GLASS-TRANSITION TEMPERATURE 80°C | 4.0 | 110 | 42.4 | 99.00 |
| COMP. TEST SAMPLE 2 | DRY | NON-CRYSTALLIZED POLYETHYLENE TEREPHTHALATE (PET) GLASS-TRANSITION TEMPERATURE 80°C | 4.5 | 90 | 42.5 | 96.10 |

FIG.4

| | SINGLE LAYER TRANSMITTANCE (%) | POLARIZATION RATE (%) |
|---|---|---|
| EXAMPLE 1 | 40.1 | 99.99 |
| | 41.4 | 99.99 |
| | 42.2 | 99.96 |
| | 42.4 | 99.95 |
| EXAMPLE 2 | 41.6 | 99.99 |
| | 42.1 | 99.99 |
| | 42.5 | 99.99 |
| | 42.8 | 99.96 |

| | SINGLE LAYER TRANSMITTANCE (%) | POLARIZATION RATE (%) |
|---|---|---|
| COMP. TEST SAMPLE 1 | 40.5 | 99.96 |
| | 41.0 | 99.79 |
| | 42.1 | 99.57 |
| | 42.4 | 99.00 |
| COMP. TEST SAMPLE 2 | 40.9 | 98.44 |
| | 42.0 | 97.18 |
| | 42.5 | 96.10 |
| | 43.6 | 94.48 |

FIG.6

THIN HIGH-PERFORMANCE POLARIZING FILM AND METHOD FOR MANUFACTURING THE SAME

CROSS REFERENCE TO RELATED APPLICATION

Related Applications

The present application is a continuation of International Application Number PCT/JP2010/001460 filed Mar. 3, 2010, the disclosure of which is hereby incorporated by reference herein in their entirety. Further, this application claims the priority of Japanese Patent Application No. 2009-051775, filed on Mar. 5, 2009 in the JPO (Japanese Intellectual Property Office), the disclosure of which are incorporated herein in their entirety by reference.

TECHNICAL FIELD

The present invention relates to a thin high-performance polarizing film formed by dyeing and stretching a polyvinyl alcohol type resin layer coated and dried on a resin substrate together with the resin substrate, and to a method for manufacturing the same.

BACKGROUND ART

Method for manufacturing a polarizing film or a so-called polarizer (hereinafter, referred as "a polarizing film") comprising a polyvinyl alcohol type resin (hereinafter, referred as "PVA type resin") layer having a dichroic material impregnated therein in a molecularly oriented state through a dyeing process has been well known. Such known technologies include a method wherein a laminate including a thin PVA type resin layer formed by coating and drying a solution of polyvinyl alcohol type resin on a resin substrate is subjected to a dry stretching process using a stretching apparatus in a heating device such as an oven, and then subjecting the laminate to a dyeing process to thereby form a thin polarizing film having a dichroic material impregnated therein in a molecularly oriented state, and alternatively, a method wherein a laminate including a thin PVA type resin layer is first subjected to a dyeing process to have a dichroic material impregnated therein, and then subjected to a dry stretching process using a stretching apparatus in a heating device to thereby form a thin polarizing film having the dichroic material impregnated therein in a molecularly oriented state, as disclosed in the Comparative Test Sample in FIG. 2.

A polarizing film used for a liquid-crystal display element laminated on each of a front and back surfaces of a liquid-crystal cell is a polarizing film having a thickness of 20 to 30 µm having a dichroic material impregnated therein, manufactured by transporting a mono-layer of a PVA type resin generally having a thickness of 60 to 80 µm through a roll type transporting apparatus having a plurality sets of rolls driven at different peripheral speeds, and dyeing the mono-layer to have the dichroic material impregnated therein, and then wet-stretching the mono-layer using a solution under a temperature ranging from a room temperature to that around 60° C. This produces a thick polarizing film. Presently, polarizing films which are in practical use in large-sized screen televisions are those having high optical properties of a single layer transmittance of 42% or higher and a polarization rate of 99.95% or higher, and may be referred as thick high-performance polarizing films.

However, since the PVA type resin is hydrophilic, a polarizing film is sensitive to changes in temperature and humidity and is apt to produce changes in dimensions such as expansion or shrinkage possibly resulting in curls. Thus, in order to suppress expansion and shrinkage and to minimize influence of temperature and/or humidity, it has been a usual practice to provide a polarizing film having a protection film laminated on each of the opposite surfaces thereof. It should however be noted that, in the case of a thick polarizing film, it is still difficult to restrict the expansion or shrinkage of the polarizing film, thus, when the polarizing film is laminated to a component such as a liquid-crystal cell, a stress is induced in such component, and may cause a distortion in a displayed image in the liquid-crystal display element. The above is the technical problem inherent in the thick polarizing film. Additionally, it is needless to mention that the thick polarizing film has to satisfy up-to-date demands to reduce thickness and energy consumption.

In order to challenge the aforementioned problems, there have been needs to a new technology for providing thin polarizing films in place of the thick polarizing films. However, if a thin PVA type resin mono-layer, for example, a PVA type resin film having a thickness less than 50 µm is passed through a roll type transporting apparatus and subjected to a wet stretching process using a solution from a room temperature up to around 60° C., the film may dissolve in the solution, or may break because of being unable to withstand the tension because the thin PVA type resin film has a hydrophilic polymer composition. As such, it has been difficult to stably manufacture a thin polarizing film from a thin PVA type resin film. To address this, the methods disclosed in the Patent Documents 1 to 3 have been developed as new manufacturing methods of thin polarizing films, where a thin polarizing film is manufactured by forming a thin layer of a PVA type resin on a resin substrate of a certain thickness and stretching the formed thin PVA type resin layer together with the resin substrate.

The above methods are not of a wet type wherein a stretching is carried out in an aqueous solution, but of a type wherein a laminate film including a resin substrate and a PVA type resin layer is subjected to a dry stretching process so that the PVA type resin is stretched together with the resin substrate using a stretching apparatus in a heating device such as an oven, and then the laminate is immersed in a dyeing solution to thereby produce a thin polarizing film formed on a resin substrate and having a dichroic material impregnated therein in a molecularly oriented state. Such manufacturing method may allow for manufacturing a thin polarizing film of a few micrometer thick having the dichroic material impregnated therein in a molecularly oriented state by forming a PVA type resin layer having a thickness of ten micrometer or a little thicker by coating and drying a solution containing a PVA type resin to a resin substrate, then subjecting the PVA type resin layer to a dry stretching using a stretching apparatus in a heating device such as an oven, and dyeing the layer to impregnate a dichroic material therein.

Figure 4:
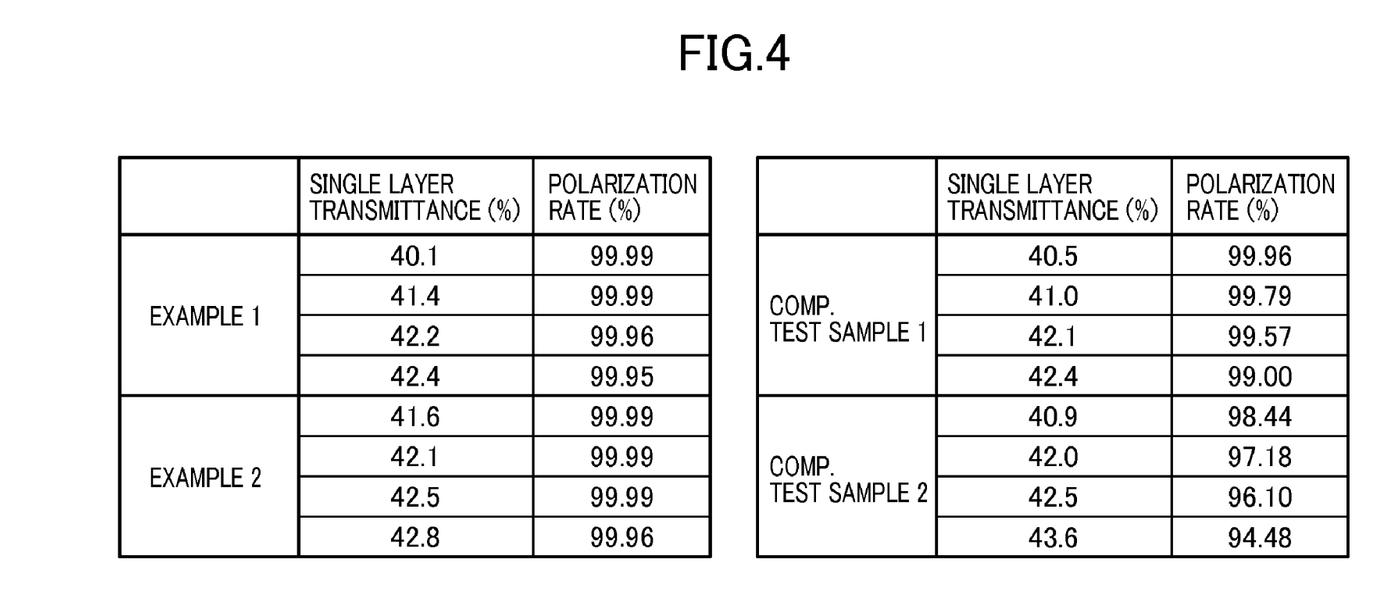
FIG. 4 shows tables of T/P values of Examples and Comparative Test Samples.
Figure 5:
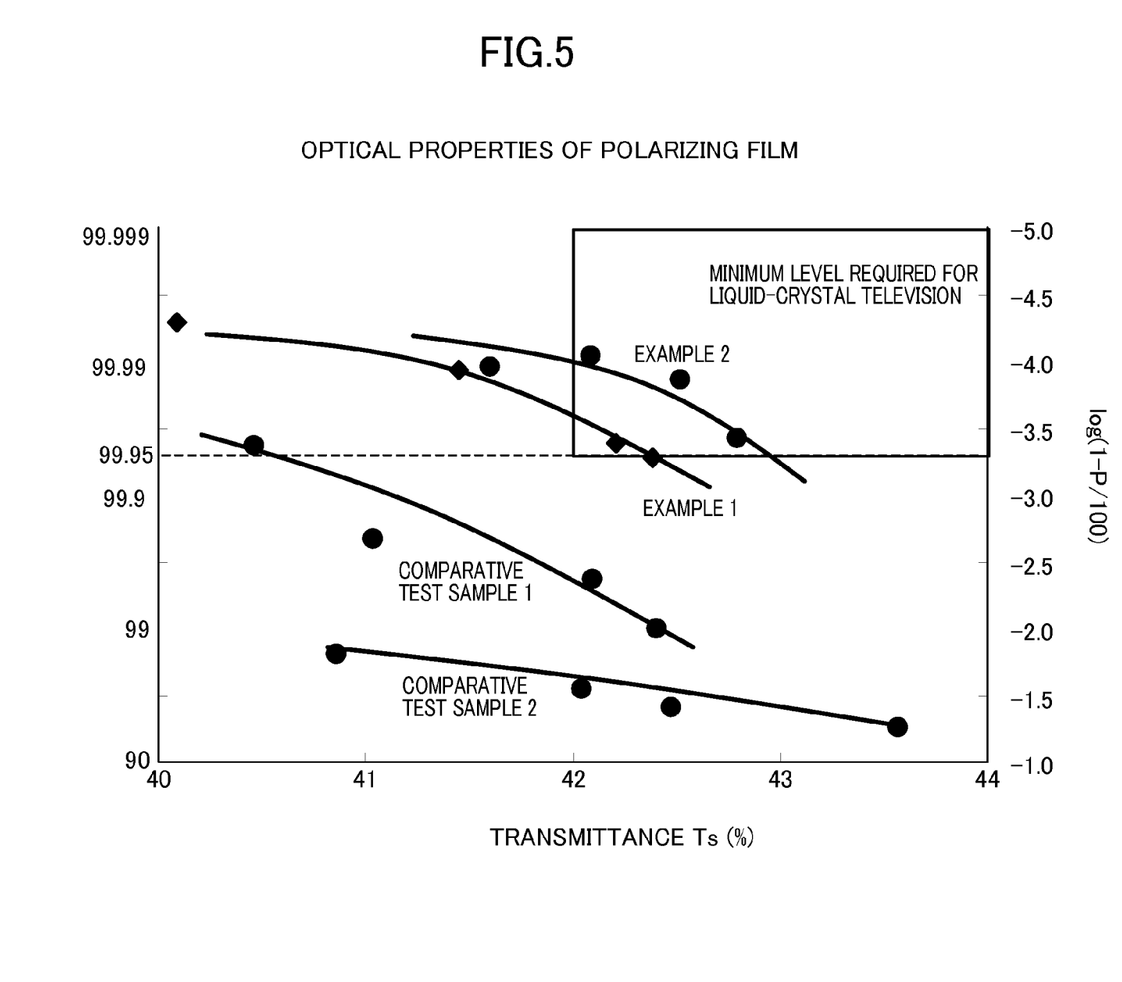
FIG. 5 is a T-P graph based on the T/P values of Examples and Comparative Test Samples.

This produces a thin polarizing film. The aforementioned manufacturing method and thin polarizing film are considered to be promising from a viewpoint of reducing the thickness of a display element, eliminating distortions in displayed images and allowing low energy consumption. However, up to now, the thin polarizing film manufactured by the aforementioned method has not overcome a technical problem of having a lower degree of optical properties as shown in the Comparative Test Samples 1 and 2 in FIGS. 4 and 5.

First, it is necessary to understand optical properties as background art. The optical properties of a polarizing film which can be used for a large size display element is represented in short by a polarization rate P and single layer transmittance T. The performance of the polarizing film is shown by a T-P graph which includes plotted values of the two optical factors such as the polarization rate P and the single layer transmittance T which are in a trade-off relationship.

Figure 6:
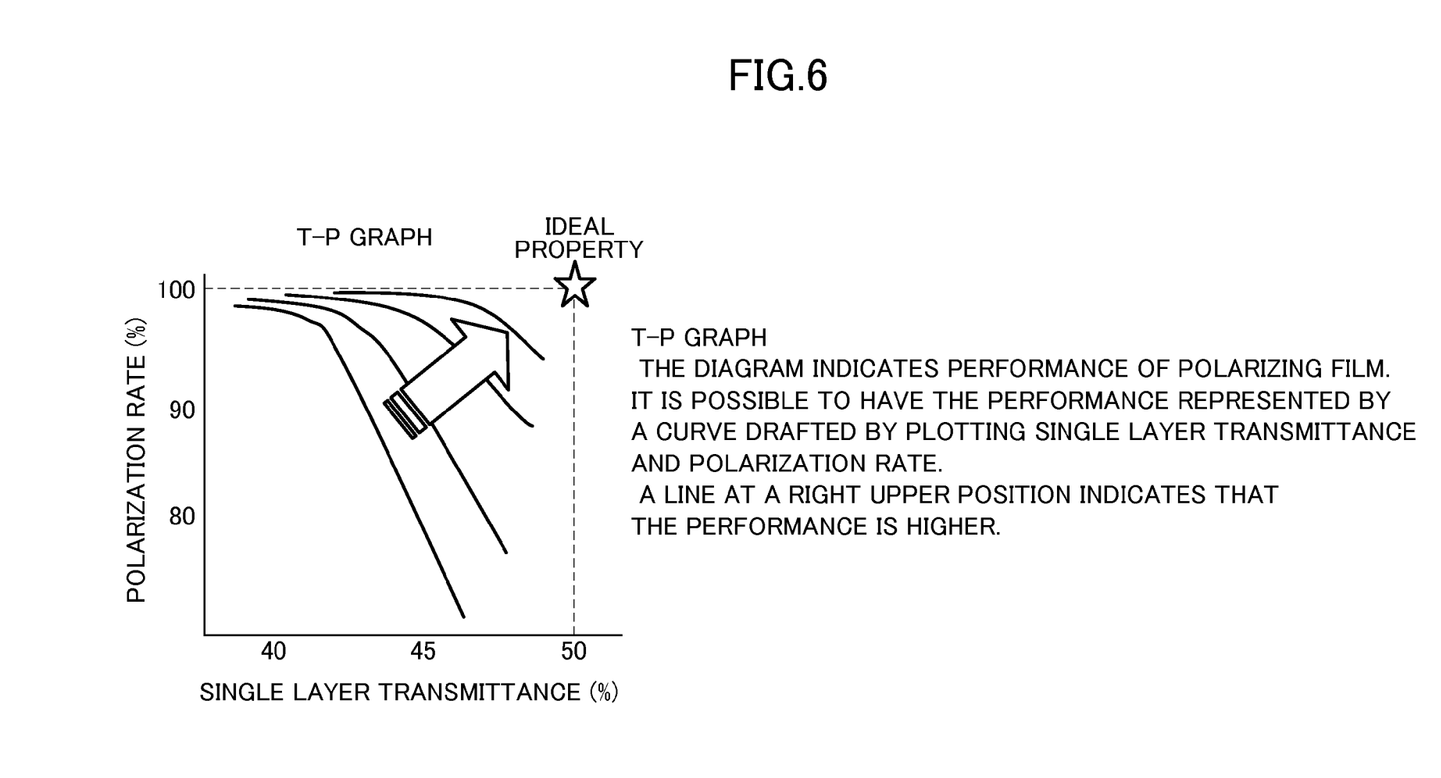
FIG. 6 is a diagram of T-P graphs.

Reference is now made to the diagram in FIG. 6. It is to be noted that an ideal property is a case where T is 50% and P is 100%. Note that it is easier to increase the value of P in a range where the value of T is relatively low, and it is difficult to increase the value of P in a range where the value of T is relatively high. Thus, it is considered that the polarization rate P of 99.95% or higher and the single layer transmittance T of 42.0% or higher are, currently or even in future, optical properties required for the performance of polarizing film for a large size display element since those specific values have not been realized in a thin polarizing film. The ideal property is a case where T is 50% and P is 100%, but when light transmits through a polarizing film, a part of light is reflected at a boundary between the polarizing film and air. Taking such reflection into consideration, it is noted that the transmittance is reduced by an extent corresponding to the portion of the reflected light, and the maximum attainable value of the single layer transmittance T may be around 45 to 46%.

The polarization rate P may be considered as representing a contrast ratio (CR) of a polarizing film or a display. The polarization rate P of 99.95% corresponds to the contrast ratio (CR) of 2000:1 of a polarizing film, and when this polarizing film is used in a cell for a liquid-crystal television commercially available, the displayed image contrast ratio (CR) corresponds to 1050:1. The contrast ratio (CR) will become better and easier to observe the displayed image with an increase in the contrast ratio (CR) of the polarizing film and that of the display. As will be described later, the contrast ratio (CR) of a polarizing film is a value of a parallel transmittance divided by a cross transmittance. The contrast ratio (CR) of a display is a value of the maximum intensity of brightness divided by the minimum brightness. The minimum brightness is the one in a black screen, and in the case of a liquid-crystal display television under a typical viewing environment, 0.5 cd/m$^2$ or lower is required. With the minimum brightness higher than the value, there will be a reduction in the color reproducibility of the liquid-crystal display. The maximum brightness is the one under a display of a white screen, and a display with the maximum brightness or luminance in a range of 450 to 550 cd/m$^2$ is used for a liquid-crystal display television under a typical viewing environment. With the maximum brightness or luminance lower than the value, there will be a reduction in visibility of the liquid crystal display.

It is considered from the above that, generally, the contrast ratio (CR) of 1000:1 or higher is required for a liquid crystal television. On the other hand, considering the depolarization in a liquid crystal cell, the contrast ratio (CR) of 2000:1 or higher is required for a polarizing film. This corresponds to the polarization rate P of 99.95 or higher.

In addition, a polarizing film having a single layer transmittance T of 42.0% or higher is generally used for liquid-crystal televisions. With the single layer transmittance T lower than the value, luminance L of the display may be reduced. For example, if the display luminance L is represented by 100 for a polarizing film having a single layer transmittance T of 42.0%, the display luminance L becomes 90 for a polarizing film having a single layer transmittance T of 40.0%. This means that in order to keep the display luminance L of 100 as in the case of a single layer transmittance T of 42.0%, it is necessary to increase a light source and/or lighting energy of a display using the polarizing film having the single layer transmittance T of 40.0% by 10%. Referring to a light source used for a display element, to make a display corresponding to the polarizing film having the single layer transmittance T of 42.0%, the display luminance L should be increased by making the light source itself to have brighter luminance.

The prior art documents referred to in the above and in the following descriptions are listed below.
Patent Document 1: Japanese Laid-Open Patent Publication JP2001-343521A
Patent Document 2: Japanese Patent 4279944B
Patent Document 3: Japanese Laid-Open Patent Publication JP51-069644A

DISCLOSURE OF THE INVENTION

Problem to be Solved by the Invention

The object of the invention is to provide a thin polarizing film having high optical properties, that is, a thin polarizing film of a high performance, and a method for manufacturing the same.

Means for Solving the Problem

The inventors of the present invention have made extensive efforts in improving optical properties of a thin polarizing film, and as the results, the inventors have noted a fact that all of the prior manufacturing methods have to adopt a dry stretching process using a stretching apparatus in a heating device such as oven. With the dry stretching process, since crystallization of a resin substrate and a PVA type resin layer formed thereon is enhanced, it is difficult to achieve a stretching ratio of 5.0 or more with respect to the original length of a laminate itself. This crystallization also applies to a case where a mono-layer is subjected to a dry stretching process to manufacture a thicker polarizing film. A dichroic material may not be sufficiently impregnated in the PVA type resin layer due to the crystallization of the PVA type resin layer and the limit of stretching ratio. This has been a first technical problem.

As a matter of fact, a thin polarizing film having optical properties comparable to that of a thick polarizing film subjected to a wet stretching process has not been developed yet. The PVA type resin is of a hydrophilic polymer composition and dissolves easily in water. The inventors of the present invention have made extensive efforts in making a thin PVA type resin layer insolubilized in a solution, making a dichroic material, which has been impregnated by a stretching at high magnification, molecularly oriented in a high-order state, and as the results, realizing a thin polarizing film having high optical properties.

The inventors of the present invention have found that a thin PVA type resin layer formed on a resin substrate by coating and drying a solution of PVA type resin may be stretched together with the resin substrate at high magnification rate (5.0 or more) in a boric acid solution of low temperature (65° C. or lower). More specifically, it is possible to insolubilize the thin PVA type resin layer formed on the resin substrate by a cross-linking in the boric acid solution of low temperature (65° C. or lower), to thereby stretch the insolubilized thin PVA type resin layer together with the resin substrate at a stretching ratio of 5.0 or more.

Further, it is to be noted that the inventors have obtained a surprising finding that the thin PVA type resin layer may be stretched together with the resin substrate at high magnification rate even in a boric acid solution having a temperature lower than a glass-transition temperature of the resin substrate itself because of plasticizing operation of a water molecule. With the above finding, the inventors have found that it is possible to obtain a thin polarizing film having high optical properties, that is, a thin high-performance polarizing film, which can be used for a large sized display element having a dichroic material impregnated in an adequate amount and molecularly oriented by a stretching at high magnification having a controlled extent of crystallization of the PVA type resin, as shown in Examples 1 and 2 of FIG. 4 or 5.

The thin high-performance polarizing film and the processes and operations used for manufacturing the same are described in the followings.

(a) Stretching Effect of Boric Acid Solution of Low Temperature (65° C. or Lower)

In order to stretch a thin PVA type resin film having a thickness of ten and a few micrometer or less in a solution at high stretching ratio, the film should be able to withstand a tension applied during stretching on the PVA type resin film itself, and also, a water resistant property should be imparted thereto so as not to be dissolved in water during stretching, even if the film is formed on a resin substrate having a thickness of 20 μm or more. Specifically, an insolubilized PVA type resin film must be used.

As shown in the following equation, boric acid generates tetrahydroxy borate anion in a solution.

$$H_3BO_3 + H_2O \leftarrow\rightarrow H^+ + [B(OH)_4]^-$$

It is expected that the tetrahydroxy borate anion forms a hydrogen bond with a hydroxy group of vinyl alcohol type polymer, and crosslinks with the vinyl alcohol type polymer. The condition such as Chemical formula (1) is considered as one of estimation models as the cross-linked condition above (the bond shown by dotted lines of Chemical formula (1) represents a cross-linking bond). With this cross-linking, the vinyl alcohol type polymer is insolubilized.

[Chemical formula 1]

(1)

According to the present invention, since a PVA type resin layer may be insolubilized when a PVA type resin is stretched in a boric acid solution, it is possible to realize a stretching at high magnification of 5.0 or more.

(b) Effect of Stretching at High Magnification

Figure 2:
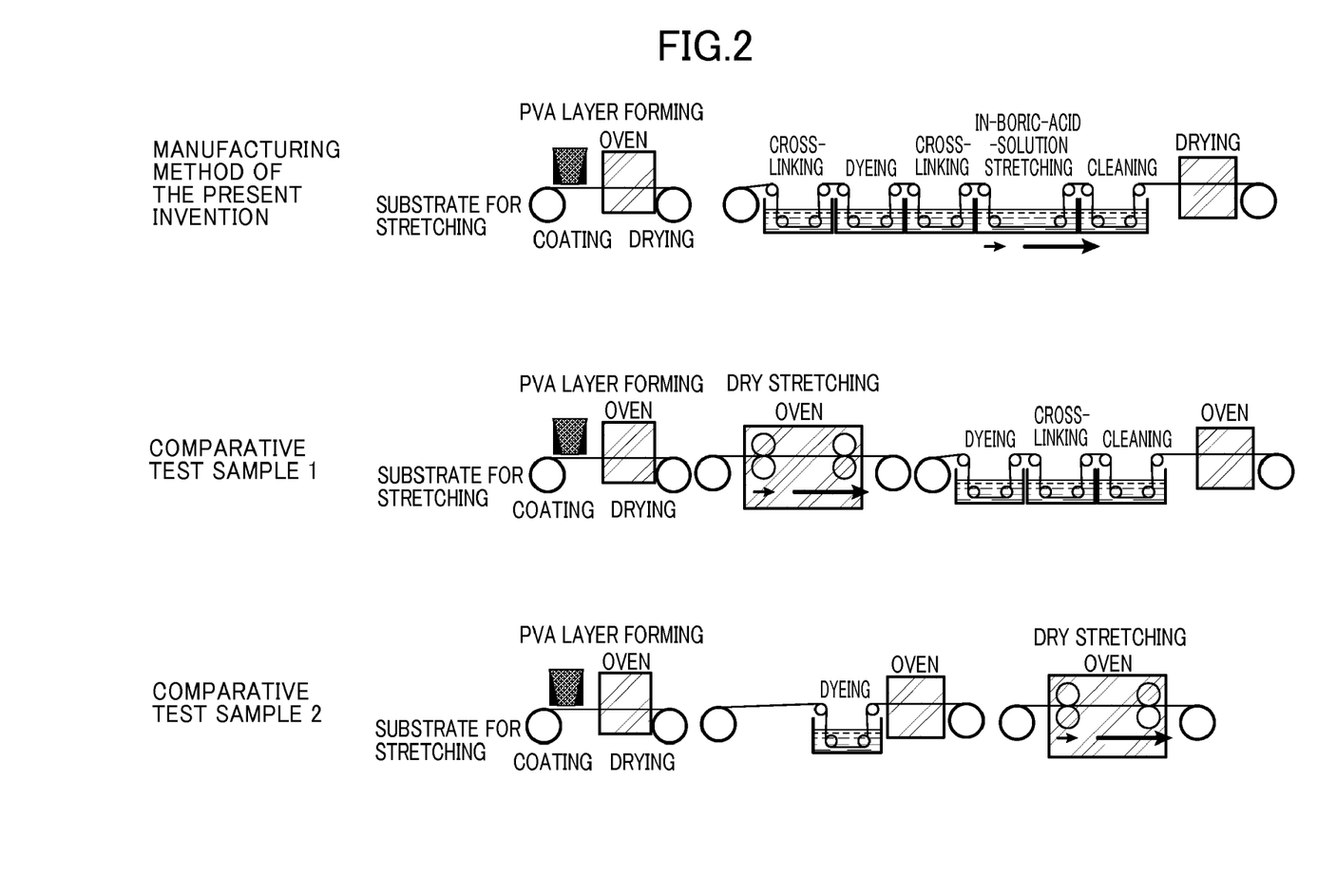
FIG. 2 is a diagram showing processes of a manufacturing method according to the present invention and manufacturing method including a dry stretching process.

With the prior art manufacturing methods of subjecting a thin PVA type resin together with a resin substrate to a dry stretching process as presented in Comparative Test Samples 1 and 2 of FIG. 2, it is difficult to obtain a thin polarizing film having a single layer transmittance of 42.0% or higher and a polarization rate of 99.95% or higher, for example. This is due to the fact that the methods adopt a stretching method such as "a dry stretching process". In the dry stretching process, it is difficult to conduct a stretching at a temperature lower than the glass-transition temperature of the material being stretched. Usually, a resin substrate in the material being stretched breaks. Even if the resin substrate is able to be stretched, it may not be a uniform stretching. Therefore, the dry stretching process is generally performed at a temperature higher than the glass-transition temperature of the resin substrate of the material to be stretched. When the stretching is performed at low temperature such as a temperature of 65° C. or lower, a resin substrate having the glass-transition temperature of 65° C. or lower must naturally be selected as a material to be stretched.

The relationship between the glass-transition temperature and the stretching temperature is also the same for the PVA type resin layer. The general glass-transition temperature of PVA type resin is 80° C., and in a case of dry stretching process, it is difficult to perform a uniform stretching at a high magnification rate under a temperature lower than 80° C. In addition, in a case of a dry stretching under any temperature, crystallization of the PVA type resin is enhanced due to the stretching, and thus, it is difficult to allow for achieving the total stretching ratio of 5.0 or more with respect to the original length including the resin substrate which is the object to be stretched. Also, due to the formation of a high-order structure (large structure) which does not contribute to an orientation as in the case of a lamellar structure or a spherocrystal, formed on the PVA resin, it is expected that a dichroic material may not be impregnated in an adequate amount and molecularly oriented in high-order. The inventors of the present invention consider this is the reason why the thin polarizing film manufactured with prior methods has low optical properties.

A manufacturing method of the present invention shown in FIG. 2 is considered. For example, a thin PVA type resin formed on a resin substrate is stretched in a boric acid solution at a temperature of 65° C. or lower. The resin substrate is a composition having a glass-transition temperature of 65° C. or higher, and is preferably the resin substrate comprising a non-crystal thermoplastic resin of ester type or olefin type. Even if the glass transition temperature of the resin substrate is 65° C. or higher, the resin substrate may be stretched at a temperature of 65° C. or lower because of a plasticizing function of water molecule. The water molecule functions as a plasticizer also for the PVA type resin. Therefore, the thin PVA type resin may be stretched together with the resin substrate in the boric acid solution at a temperature of 65° C. or lower.

This makes the thin PVA type resin to be stretched at a high magnification rate of 5.0 or more while preventing the crystallization of the PVA type resin. The result leads the inventors to an assumption that the orientation of the non-crystal part of the thin PVA type resin is enhanced. In addition, by stretching at a high magnification rate, a dichroic material such as polyiodide ion complex existing in the PVA type resin is aligned in one direction at a high order. As the result, a thin polarizing film having high optical properties, that is, a thin high-performance polarizing film is obtained.

The followings set forth modes of embodiments of the present invention.

According to a first aspect, the present invention relates to a thin high-performance polarizing film having a thickness of 7 μm or less comprising a PVA type resin having a dichroic material impregnated therein in a molecularly oriented state, formed integrally on a resin substrate, wherein the thin high-performance polarizing film has optical properties of a single layer transmittance of 42.0% or higher and a polarization rate of 99.95% or higher. Reference is now made to the Table in FIG. 3. In this Table, it is noted that the inventors of the present invention have successfully developed a thin high-performance polarizing film close to ideal properties shown in the T-P graph of FIG. 6 which had previously been considered to be difficult, and enabled reduction of display element thickness, elimination of distortions in displayed images and reduction of energy consumptions. These are comparable to the optical properties realized in the thick polarizing film.

According to the first aspect of the present invention, the resin substrate is a thermoplastic resin of ester type or olefin type having percentage of water absorption of 0.50% or higher and a glass-transition temperature in a range of 25° C. to 85° C. One of the specific examples of the resin substrate includes a non-crystal polyethylene terephthalate film of ester-type resin film (amorphous polyethylene terephthalate film or A-PET film). In addition, when the resin substrate is made as an optically functional film to protect one of the surfaces of the thin high-performance polarizing film, the resin substrate is preferably a transparent resin. In addition, the dichroic material impregnated and molecularly oriented in the thin high-performance polarizing film may be iodine, organic dye or a mixture thereof.

According to a second aspect, the present invention relates to a method for manufacturing a thin high-performance polarizing film having a thickness of 7 μm or less and comprising a PVA type resin having a dichroic material impregnated therein in a molecularly oriented state, wherein the thin high-performance polarizing film has optical properties of a single layer transmittance of 42.0% or higher and a polarization rate of 99.95% or higher. Specifically, the method may initially include a process of coating a PVA type resin solution on a resin substrate having a thickness of at least 20 μm and then drying the solution to thereby form a PVA type resin layer. The resin substrate in the present invention is also a thermoplastic resin of ester type or olefin type having percentage of water absorption of 0.50% or higher and a glass-transition temperature in a range of 25° C. to 85° C. as in the first aspect, and when the resin substrate is made in the form of an optically functional film to protect one of the surfaces of the thin high-performance polarizing film, the resin substrate should preferably be a transparent resin.

Then, the method may include a process of immersing the produced PVA type resin layer in a dyeing solution of a dichroic material to thereby impregnate the dichroic material in the PVA type resin layer. The dichroic material may be iodine, organic dye or a mixture thereof as in the first aspect. In addition, the dichroic material is impregnated in the PVA type resin layer by immersing the PVA type resin layer for 5 to 60 seconds in a dyeing solution which contains 0.1 wt % or higher to 4.5 wt % or lower of the dichroic material. In case where iodine is used as the dichroic material, iodide is preferably further added because it may promote dissolution of iodine and further improve dyeing efficiency.

By the way, in the dyeing process, the effect of the hydrophilic PVA type resin dissolving in the solution is not problematic in manufacturing a thick polarizing film, however, it is one of technical problems not negligible in manufacturing a thin polarizing film. The problem is how to prevent elution of PVA type resin in the solution during dyeing. It is not problematic if the dyeing process lasts only for a short time, but depending on circumstances, the finish of the polarizing film may be affected. Therefore, the inventors have found that it is effective to subject the PVA type resin layer to a preliminary insolubilization treatment before immersing the PVA type resin layer produced on the resin substrate in a dyeing solution, and found that, as a method for the above, the insolubilization of the PVA type resin layer is possible by immersing the PVA type resin layer in a boric acid solution at a room temperature.

In addition, the method may include a process of stretching the PVA type resin layer having the dichroic material impregnated therein together with the resin substrate in the boric acid solution. Since the PVA type resin layer, which becomes thinner during stretching, dissolves in the solution, it is difficult to stretch the PVA type resin layer such that a total stretching ratio of 5.0 or more of the original length is achieved, that is, it is difficult to stretch the PVA type resin layer to a length of 5.0 times or more of the original length. It has been allowed for stretching the PVA type resin layer having a dichroic material impregnated therein at a high magnification rate and improving orientation properties by immersing in the boric acid solution which boric acid enables cross-linking and insolubilizing simultaneously.

As already described, in manufacturing a thin polarizing film, "a dry stretching process" has not been able to achieve a total stretching ratio of 5.0 or more with respect to the original length. In addition, from a view point of preventing crystallization of the PVA type resin layer during stretching, it is preferable that a boric acid solution of low temperature such as 65° C. or lower is used by selecting a resin substrate that can be stretched at high magnification even at a temperature lower than the glass-transition temperature of the resin substrate itself.

Figure 3:
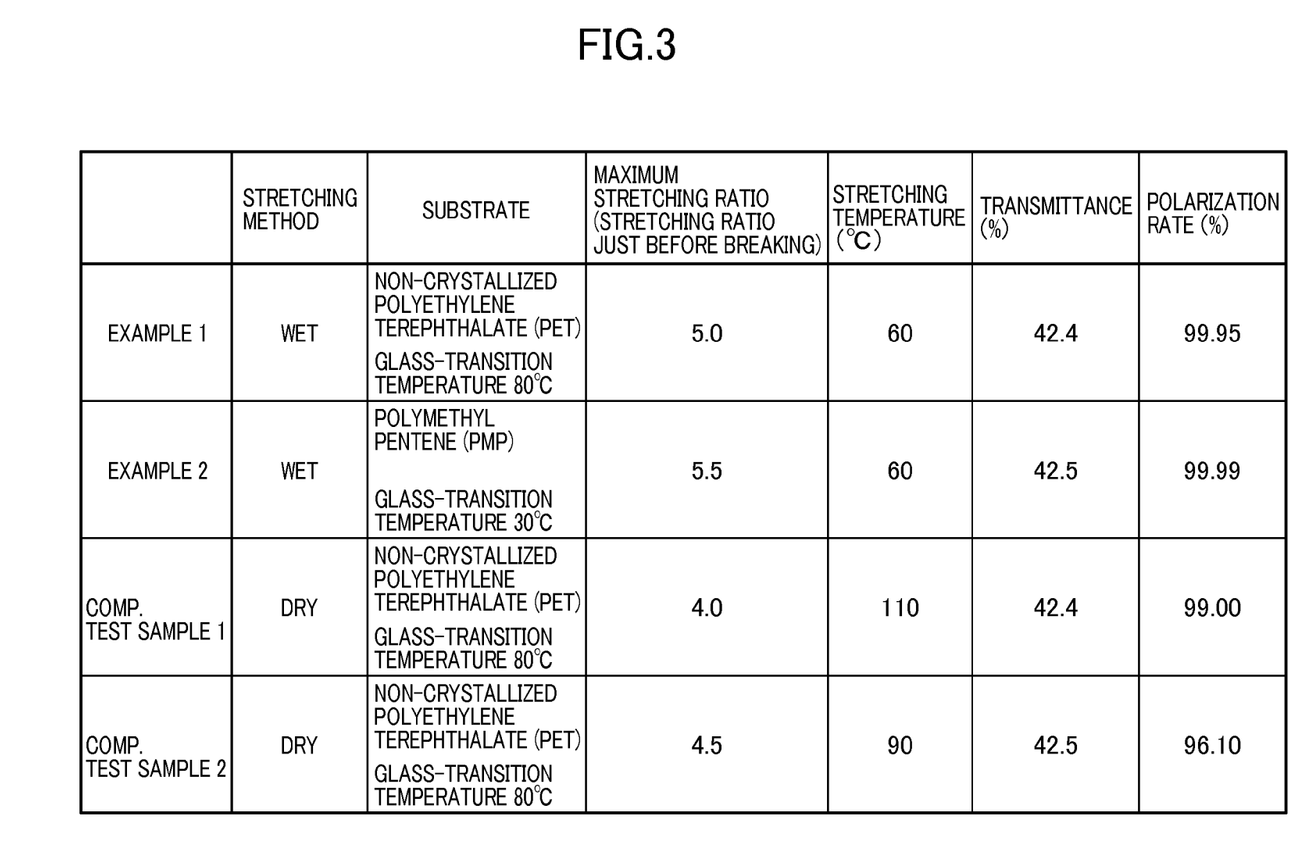
FIG. 3 is a comparative table showing optical properties of Examples and Comparative Test Samples.

As shown in Table of FIG. 3, the above processes allow for forming a thin high-performance polarizing film having a thickness of 7 μm or less comprising a PVA type resin having a dichroic material impregnated therein in a molecularly oriented state, wherein the thin high-performance polarizing film has optical properties of a single layer transmittance of 42.0% or higher and a polarization rate of 99.95% or higher.

It may be provided as that another resin film is attached via a bonding agent to a surface of a thin high-performance polarizing film opposite to the surface attached to a resin substrate integrally formed therewith, while simultaneously peeling the resin substrate from the thin high-performance polarizing film to thereby transfer the thin high-performance polarizing film to the another resin film. By using an optically functional film for the transferred resin film, the optically functional film on one of the surfaces of the produced thin high-performance polarizing film may be formed. In addition, it may be provided as that a second optically functional film is attached via a bonding agent to a surface of the thin high-performance polarizing film opposite to the surface which is attached to the optically functional film. A thin high-performance polarizing film having the optically functional film on both surfaces may thereby be manufactured.

According to a third aspect, the present invention relates to a method of manufacturing a laminate film including a thin high-performance polarizing film having a dichroic material impregnated therein in a molecularly oriented state. Specifically, the present invention relates to a method of manufacturing a laminate film including a thin high-performance polarizing film formed on one of the surfaces of a resin substrate and having a thickness of 7 μm or less, the polarizing film comprising a PVA type resin layer having a dichroic material impregnated therein in a molecularly oriented state and having optical properties of a single layer transmittance of 42.0% or higher and a polarization rate of 99.95% or higher, wherein the method includes following processes.

The method may include a process of manufacturing a laminate film including a resin substrate having a thickness of at least 20 μm and a PVA type resin layer formed by coating a solution comprising a PVA type resin on one of the surfaces of the resin substrate and then drying. The resin substrate of the present invention is also a thermoplastic resin of ester type or olefin type having percentage of water absorption of 0.50% or higher and a glass-transition temperature in a range of 25° C. to 85° C. as in the case of the first and second aspects. In addition, when the resin substrate is made in the form of an optically functional film to protect one of the surfaces of the thin high-performance polarizing film, the resin substrate is preferably made of a transparent resin.

The method may include a process of immersing the laminate film including the resin substrate and the PVA type resin layer formed on one of the surfaces of the resin substrate in a dyeing solution containing a dichroic material to thereby impregnate the dichroic material in the PVA type resin layer included in the laminate film. Dichroic material may be iodine, organic dye or a mixture thereof as in the first and second aspects. The dichroic material is impregnated in the PVA type resin layer by immersing the PVA type resin layer for 5 to 60 seconds in a dyeing solution containing the dichroic material from 0.1 wt % or higher to 4.5 wt % or lower as in the second aspect. In case where iodine is used as the dichroic material, iodide is preferably further added because it may promote dissolution of iodine and further improve dyeing efficiency. In addition, the PVA type resin layer may preferably be subjected to a preliminary insolubilization treatment by immersing the laminate film in a boric acid solution at a room temperature before the PVA type resin layer included in the laminate film is immersed in the dyeing solution containing the dichroic material.

The method may further include a process of stretching the laminate film including the PVA type resin layer having the dichroic material impregnated therein in a boric acid solution. As indicated above in association with the second aspect, the PVA type resin layer, which becomes thinner with the resin substrate during stretching, dissolves in the solution, it is difficult to stretch the PVA type resin layer to a total stretching ratio of 5.0 or more, that is, so that it is difficult to stretch the PVA type resin layer to a length of 5.0 times or more of the original length. It has become possible to stretch the PVA type resin layer having a dichroic material impregnated therein at a high magnification rate and improve orientation properties by immersing in a boric acid solution with which the boric acid enables cross-linking and insolubilizing simultaneously.

From a view point of preventing crystallization of the PVA type resin layer during stretching of the laminate film, it is preferable to use a boric acid solution of low temperature such as 65° C. or lower by selecting a resin substrate that can be stretched at high magnification even at a temperature lower than a glass-transition temperature of the resin substrate itself.

As shown in the Table of FIG. 3, the above processes allow for manufacturing a laminate film including a thin high-performance polarizing film having a thickness of 7 μm or less and comprising a PVA type resin layer having a dichroic material impregnated therein in a molecularly oriented state, the polarizing film being formed on one of the surfaces of the resin substrate, wherein the thin high-performance polarizing film has optical properties of a single layer transmittance of 42.0% or higher and a polarization rate of 99.95% or higher.

The method may further include a process of cleaning a laminate film including a thin high-performance polarizing film comprising a PVA type resin having a dichroic material impregnated therein in a molecularly oriented state, with a solution containing iodide salt and having a temperature lower than the glass-transition temperature of a resin substrate included in the film laminate. The method may further include a process of drying the cleaned laminate film at a temperature in the range of 50° C. or higher to 100° C. or lower.

In addition, it is possible to manufacture a thin high-performance polarizing film having the optically functional film formed on each of the both surfaces by a process of attaching an optically functional film through a bonding agent to a thin high-performance polarizing film at a surface opposite to the surface which is attached to one of the surfaces of a resin substrate film included in a dried laminate film. Alternatively, it may be possible to have another resin film attached via a bonding agent to a thin high-performance polarizing film at a surface opposite to the surface which is attached to the resin substrate included in the dried laminate film, while simultaneously peeling the resin substrate from the thin high-performance polarizing film to transfer the thin high-performance polarizing film to the another resin film for forming an optically functional film comprising the transferred resin film on one of the surfaces thereof.

BEST MODE FOR CARRYING OUT THE INVENTION

Outline of Manufacturing Process of Thin High-Performance Polarizing Film

Figure 1:
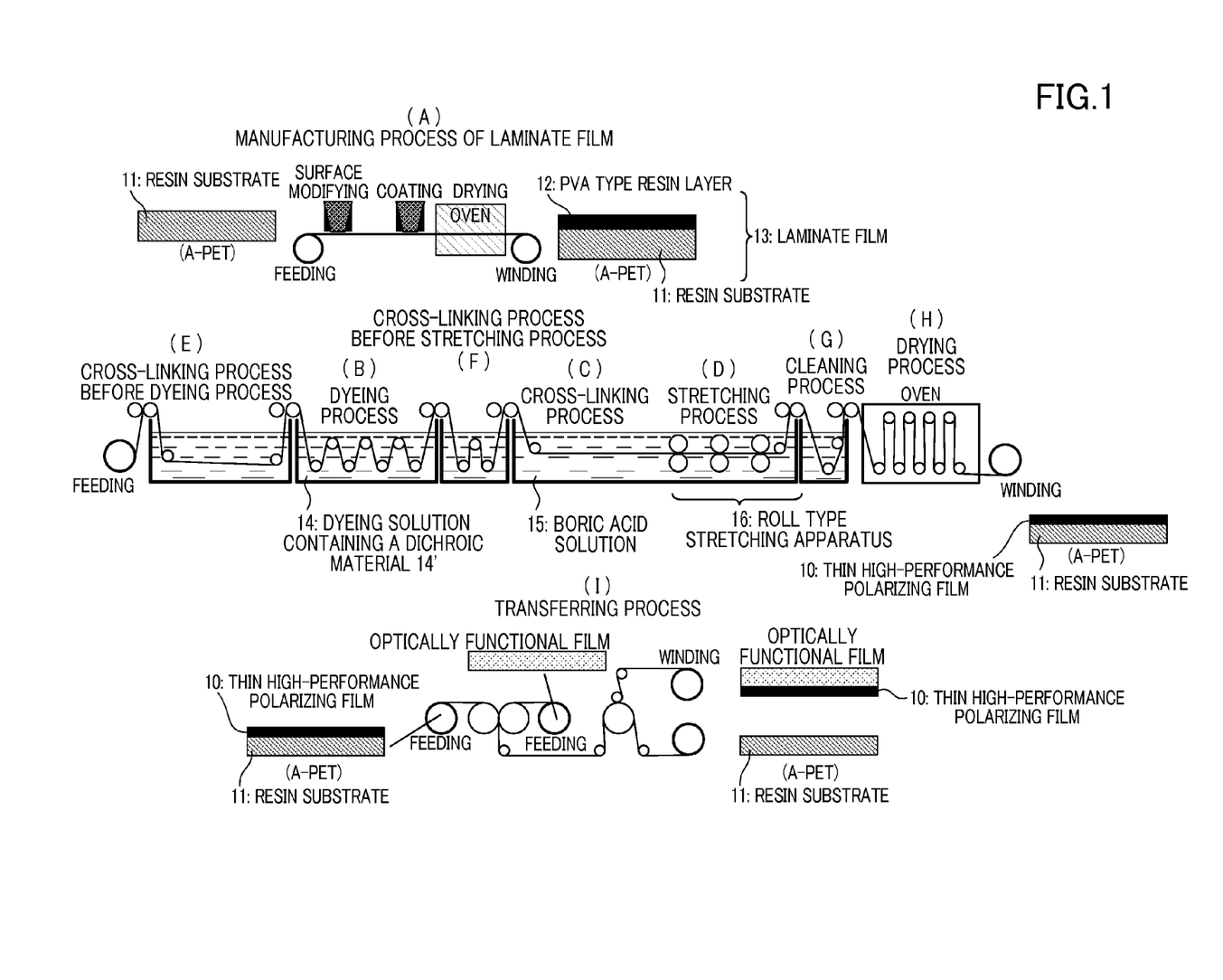
FIG. 1 is a schematic diagram showing a manufacturing process of a thin high-performance polarizing film according to the present invention.

The process for manufacturing a thin high-performance polarizing film 10 is shown with reference to Example 1. As shown in FIG. 1, for example, use is made of a non-crystallized polyethylene terephthalate film having a glass-transition temperature of 80° C. for resin substrate 11. The resin substrate 11 may support one of the surfaces of the thin high-performance polarizing film 10. The resin substrate 11 before stretching may preferably have a thickness in a range of 20 to 500 μm. Hydrophobic resin which is insoluble in water and of a non-swelling property may be used for the resin substrate 11 to prevent the substrate from being dyed by the dichroic material 14'. Hydrophobic resin, in particular, may be of a type which does not have any dissociable group such as carboxyl group, sulfonic group, and 4-amino group, or any nonionic hydrophilic group such as hydroxyl group and amide group.

The resin substrate 11 is for example comprised of an ester type resin film or an olefin type resin film, and is preferably non-crystallized polyethylene terephthalate film. Polyethylene terephthalate film after crystallization generally has high elastic modulus and is difficult to stretch at a low temperature, while non-crystallized polyethylene terephthalate film may be stretched at a low temperature. Surface modifying treatment including corona treatment may be applied to their surfaces to improve adhesion with the PVA type resin layer 12. A bonding layer may also be provided. Percentage of water absorption of the resin substrate 11 (measured according to JIS K 7209) is preferably 0.3% or higher, and more preferably 0.5% or higher. Glass-transition temperature of the resin substrate (measured according to JIS K 7121, Dynamic Susceptibility Contrast (DSC) method) is preferably 85° C. or lower, and more preferably 25° C. to 85° C. Resin film with such properties may be stretched at a high magnification rate even in a boric acid solution at 65° C. or lower.

The laminate film 13 comprising the resin substrate 11 and the PVA type resin layer 12 may be manufactured in a manufacturing process (A).

In the manufacturing process (A), there is first provided a roll of film consisting of the resin substrate 11 having a thickness of 100 μm. Then, a solution containing 3 to 10 parts by weight of PVA type resin with respect to 100 parts by weight of solvent is prepared. The resin substrate 11 is then fed from the roll and the PVA type resin solution is coated on the resin substrate 11, to laminate 10 μm-thick PVA type resin layer 12 on the resin substrate 11 thereafter drying in an oven at 60° C. A continuous web of laminate film 13 manufactured in this way may be wound into a roll. The laminate film 13 is then handled in a continuous process which will be described in the followings.

Dyeing process (B) is a process where the laminate film 13 is immersed in a dyeing solution 14 to have the dichroic material 14' impregnated in the PVA type resin layer 12. Water is generally used as a solvent of the dyeing solution 14. The dichroic material 14' is generally used at a ratio of 0.1 to 4.3 parts by weight (0.1 to 4.5 wt %) with respect to 100 parts by weight of solvent. The dichroic material 14' may be iodine, organic dye and a mixture thereof, for example. One type of or two or more types of dichroic materials may be used.

In case where iodine is used as the dichroic material 14', iodide is preferably further added because it may promote dissolution of iodine and further improve dyeing efficiency. Iodide is preferably used at a ratio of 0.02 to 20 parts by weight, and more preferably 0.1 to 10 parts by weight with respect to 100 parts by weight of solvent. Particular examples of iodide may include potassium iodide, lithium iodide, sodium iodide, zinc iodide, aluminum iodide, lead iodide, copper iodide, barium iodide, calcium iodide, tin iodide, and titanium iodide. Among the above substances, it is preferable to use potassium iodide. Time of immersing in the dyeing solution 14 is not particularly specified and may generally be 5 seconds to 5 minutes. Temperature of the dyeing solution 14 is generally 20 to 50° C.

In the dyeing process (B), the laminate film 13 is immersed for 30 seconds in the dyeing solution 14 containing iodine and potassium iodide at a solution temperature of 30° C., to thereby have iodine impregnated in the PVA type resin layer 12. Iodine content in the dyeing solution 14 was 0.1 parts by weight with respect to 100 parts by weight of water, and potassium iodide content was 0.7 parts by weight with respect to 100 parts by weight of water.

Cross-linking process (C) which may be integrated with a stretching process (D) is a process where the laminate film 13 is immersed in a boric acid solution 15 to cross-link the PVA type resin layer 12 having the dichroic material 14' impregnated therein. The cross-linking process (C) is also an insolubilization process so as to make any swelled PVA type resin insoluble to water.

The boric acid solution 15 may be obtained by dissolving a boric acid or a boric acid salt in water which is a solvent. Other than the boric acid or boric acid salt, a boron compound such as borax, glyoxal, and glutaraldehyde may be used. Boric acid is generally used at a ratio of 1 to 10 parts by weight with respect to 100 parts by weight of water. Iodide is preferably added to restrict elution of iodine impregnated in the PVA type resin layer 12. Iodide content is preferably 0.05 to 15 parts by weight, and more preferably 0.5 to 8 parts by weight. Particular examples of iodide are identical to those listed for the dyeing process (A). Time of immersing in the boric acid solution 15 is not particularly specified and may generally be 15 seconds to 5 minutes. Temperature of the boric acid solution 15 is generally 20 to 70° C.

The PVA type resin layer 12 including iodine impregnated therein was stretched together with the resin substrate 11 with a roll stretching apparatus 16 having a plurality of pairs of rolls driven with different peripheral speeds, while being cross-linked in the boric acid solution 15 containing potassium iodide at a solution temperature of 60° C. This is the cross-linking process (C) carried out together with the stretching process (D). In the stretching process (D), the laminate film 13 was longitudinally uniaxially stretched to a stretching ratio of 5.0. Boric acid content in the boric acid solution 15 was 4 parts by weight with respect to 100 parts by weight of water, and potassium iodide content was 5 parts by weight with respect to 100 parts by weight of water.

It is preferable that temperature of the boric acid solution is 85° C. or lower. When the temperature exceeds 85° C., elution of iodine impregnated in the PVA type resin may be accelerated, and even the PVA type resin itself may be eluted, resulting in a deterioration of the optical property of the manufactured thin high-performance polarizing film 10. When the thickness of the PVA type resin layer 12 is not sufficiently large, the PVA type resin layer 12 will be dissolved causing a further deterioration of the optical property of the thin high-performance polarizing film 10. It is more preferable that the temperature of the boric acid solution is 30 to 65° C. When the temperature of the boric acid solution 15 is lower than 30° C., water does not sufficiently act as a plasticizer, and thus the resin substrate 11 and the PVA type resin layer 12 will not be sufficiently softened to allow for achieving the total stretching ratio of 5.0 or more with respect to the original length of the laminate film 13.

The stretching ratio of the laminate film stretched in the boric acid solution 15 is preferably 5.0 or more, and more preferably 5.5 or more with respect to the original length of the laminate film 13. When the stretching ratio is less than 5.0, the dichroic material 14' is not sufficiently molecularly oriented resulting in a deterioration in the optical property of the obtained thin high-performance polarizing film 10. In the present invention, when the stretching ratio exceeds 6.5, the laminate film 13 may easily be broken and is difficult to perform a stable manufacture. In the present invention, when the stretching process is carried out as a one stage process, the term "stretching ratio" refers to a stretching ratio in the process. When the stretching process is carried out as a multiple stages process by providing a plurality of stretching apparatus in the solution, the term "stretching ratio" refers to total stretching ratio which is a sum of stretching ratios in all of the processes.

As shown in FIG. 1, a cross-linking process in the boric acid solution may be provided as a pretreatment process prior to the dyeing process (B). The cross-linking process (E) is not required in manufacturing a thick polarizing film because dissolution of PVA type resin is not problematic. However, in manufacturing a thin high-performance polarizing film 10 using the laminate film 13 in which the thin PVA resin layer 12 is laminated on the resin substrate 11, dissolution of the PVA type resin in the dyeing solution 14 is not negligible. Thus, it is effective to provide the cross-linking process (E) as a pretreatment process prior to the dyeing process (B) in manufacturing a thin high-performance polarizing film having a high optical property. In view of compensating the amount of the boric acid lost during the dyeing process, a cross-linking process (F) in a boric acid solution may be separately provided as a pretreatment process prior to the stretching process (D) in the boric acid solution.

The laminate film 13 stretched to a stretching ratio of 5.0 with respect to the original length was taken out from the boric acid solution 15 and then sent to a cleaning process (G). The cleaning process (G) is a process for cleaning unnecessary residuals which may be left on the laminate film having the thin high-performance polarizing film 10 on which various processes are carried out. If the cleaning process is not sufficiently performed, the boric acid may be left on the thin high-performance polarizing film 10 after drying. Cleaning is performed in a cleaning solution containing a potassium iodide to prevent dissolution of the PVA type resin. Content of potassium iodide in the cleaning solution is 0.5 to 10 wt %, and temperature of the cleaning solution is 10 to 50° C. Time of immersing is typically 1 second to 1 minute.

A drying process (H) is carried out as the last process. Any appropriate method, such as natural drying, blow drying and heat drying, may be adopted in the drying process (H). In Example 1, the laminate film 13 was dried for 30 seconds with warm air at a temperature of 60° C.

The thickness of the PVA type resin layer 12 stretched together with the resin substrate 11 included in the finished laminate film was 3 μm. As such, the thin high-performance polarizing film 10 consisting of 3 μm-thick PVA type resin having iodine molecularly oriented therein was in a state that it is laminated on the resin substrate 11. Table in FIG. 3 shows properties of the thin high-performance polarizing film 10 of Example 1.

In the laminate film having the thin high-performance polarizing film 10 laminated on the resin substrate 11, the thin high-performance polarizing film 10 may be transferred to another optically functional film while the resin substrate 11 is being simultaneously peeled therefrom in transferring process (I) as shown in FIG. 1.

A PVA type resin which can be used in the present invention may be obtained by saponification of a polyvinyl acetate resin. Extent of the saponification is generally 85 to 100 mol %, and extent of polymerization is generally 1,000 to 10,000. The PVA type resin is a polyvinyl alcohol or an ethylene-vinyl alcohol copolymer.

Manufactured thin high-performance polarizing film 10 preferably shows a dichroic absorption property at any of wavelength of visible light (wavelength of 380 to 780 nm). Its thickness is 7 μm or less and is preferably 0.5 to 5 μm. Since contraction or shrinkage stress of the thin high-performance polarizing film 10 is small, it has an excellent dimensional stability even under a high temperature environment. Its optical properties such as a single layer transmittance is 42.0% or higher and a polarization rate is 99.95% or higher.

EXAMPLES

Example 1

Non-crystallized polyethylene terephthalate film (Nova Clear available from Mitsubishi Plastics, Inc.) with a glass-transition temperature of 80° C. was used as the resin substrate. A laminate film including the resin substrate and a polyvinyl alcohol layer was manufactured as follows. First, 100 μm-thick resin substrate was prepared. A solution of polyvinyl alcohol (NH26 from Nippon Synthetic Chemical Industry Co., Ltd.) was coated on the resin substrate to form a 10 μm-thick polyvinyl alcohol layer and dried the polyvinyl alcohol layer under a temperature of 60° C.

The laminate film manufactured in the aforementioned process was immersed for an arbitrary time in dyeing solution containing iodine and potassium iodide at a solution temperature of 30° C. such as to obtain a final polarizing film having a single layer transmittance of 40 to 44%. Through the process, iodine was impregnated in the polyvinyl alcohol layer. Iodine content in dyeing solution was 0.1 parts by weight with respect to 100 parts by weight of water, and potassium iodide content was 0.7 parts by weight with respect to 100 parts by weight of water.

The laminate film including polyvinyl alcohol layer formed on the resin substrate and having iodine impregnated therein was uniaxially stretched in the longitudinal direction through a plurality of pairs of rolls driven with different peripheral speeds, in boric acid solution containing boric acid and potassium iodide at a solution temperature of 60° C., up to immediately before a point where breaking occurs in the laminate film. The stretching ratio (maximum stretching ratio) obtained in this instance was 5.0. Boric acid content in the boric acid solution was 4 parts by weight with respect to 100 parts by weight of water, and potassium iodide content was 5 parts by weight with respect to 100 parts by weight of water. Herein, the "immediately before a point where breaking occurs" and the "maximum stretching ratio" were determined through preliminary investigations for verifying stretching ratio at which the laminate film was broken. In particular, these terms refer to a stretching ratio smaller by 0.2 than the preliminarily confirmed stretching ratio at which the laminate film was broken.

The laminate film stretched to a stretching ratio of 5.0 was taken out of the boric acid solution, and then dried with warm air under a temperature of 60° C. The polyvinyl alcohol layer stretched together with the resin substrate had a thickness of 3 μm. In this manner, a 3 μm-thick polyvinyl alcohol resin layer having iodine molecularly oriented therein was formed on the resin substrate. This is the thin high-performance polarizing film of Example 1 having properties in Table in FIG. 3.

Example 2

A polymethylpentene film (TPX from Mitsui Chemicals, Inc.) having a glass-transition temperature of 30° C. was used as the resin substrate. In Example 2, similarly as in Example 1, a laminate film including polyvinyl alcohol layer formed on the resin substrate and having iodine impregnated therein was uniaxially stretched in the longitudinal direction through a plurality of pairs of rolls driven with different peripheral speeds, in a boric acid solution containing boric acid and potassium iodide at a solution temperature of 60° C., up to immediately before a point where breaking occurs in the laminate film. Stretching ratio (maximum stretching ratio) in this instance was 5.5.

Herein, the "immediately before a point where breaking occurs" and the "maximum stretching ratio," as in Example 1, refer to a stretching ratio smaller by 0.2 than the preliminarily confirmed stretching ratio at which the laminate film was broken. In this manner, a 3 μm-thick polyvinyl alcohol resin layer having iodine molecularly oriented therein was formed on the resin substrate. This is the thin high-performance polarizing film of Example 2 having properties shown in Table in FIG. 3.

(Comparative Test Sample 1)

A non-crystallized polyethylene terephthalate film (Nova Clear from Mitsubishi Plastics, Inc.) having a glass-transition temperature of 80° C. was used as the resin substrate. As in the case of the Example 1, there was manufactured a laminate film including a 10 μm-thick polyvinyl alcohol layer formed on a 100 μm-thick resin substrate. Then, the manufactured laminate film was longitudinally and uniaxially stretched in an oven at a temperature of 110° C. up to immediately before a point where breaking occurs. The stretching ratio (maximum stretching ratio) obtained in this instance was 4.0. Herein, the "immediately before a point where breaking occurs" and the "maximum stretching ratio," as in Example 1, refer to a stretching ratio smaller by 0.2 than the preliminarily confirmed stretching ratio at which the laminate film was broken.

Further, as in the case of the Example 1, the stretched laminate film was immersed for an arbitrary time in a dyeing solution so as to obtain a final polarizing film having a single layer transmittance of 40 to 44%. The laminate film taken out from the dyeing solution was dried with warm air under a temperature of 60° C. The thickness of the polyvinyl alcohol layer stretched together with the resin substrate was 4 μm. In this manner, a 4 μm-thick polyvinyl alcohol resin layer having iodine molecularly oriented therein was formed on the resin substrate. This is the thin polarizing film of Comparative Test Sample 1 having properties shown in Table in FIG. 3.

(Comparative Test Sample 2)

As in the case of the Example 1, a laminate film including a 10 μm-thick polyvinyl alcohol layer formed on a 100 μm-thick resin substrate was manufactured. Then, as in Example 1, the laminate film manufactured in this manner was immersed for an arbitrary time in a dyeing solution so as to obtain a final polarizing film having a single layer transmittance of 40 to 44%. The laminate film taken out from the dyeing solution was dried with warm air under a temperature of 60° C. Then, the laminate film having iodine impregnated therein was longitudinally and uniaxially stretched in an oven at a temperature of 90° C. up to immediately before a point where breaking occurs. The stretching ratio (maximum stretching ratio) obtained in this instance was 4.5. Herein, the "immediately before a point where breaking occurs" and the "maximum stretching ratio," as in Example 1, refer to a stretching ratio smaller by 0.2 than the preliminarily confirmed stretching ratio at which the laminate film was broken.

The thickness of the polyvinyl alcohol layer stretched together with the resin substrate was 4 μm. In this manner, a 4 μm-thick polyvinyl alcohol resin layer having iodine molecularly oriented therein was formed on the resin substrate. This is the thin polarizing film of Comparative Test Sample 2 having properties thereof shown in Table in FIG. 3.

(Measurement Process)

(Thickness Measurement)

The thickness of the resin substrate and that of the thin polarizing film were measured with a digital micrometer (KC-351C from Anritsu Electric Co., Ltd.).

(Measurement of Transmittance and Polarization Rate)

Each of the single transmittance T, the parallel transmittance Tp and the cross transmittance Tc of the polarizing film was measured using a UV-visible spectrophotometer (V7100 from JASCO Corporation). The values of the T, Tp and Tc are Y values measured according to JIS Z8701 (visual field of 2 degrees, C light source) and corrected for spectral luminous efficacy.

The polarization rate P was calculated with the following equation using the above transmittance value.

$$P=\{(Tp-Tc)/(Tp+Tc)\}^{1/2} \times 100$$

Contrast ratio (CR) of the polarizing film was calculated with the following equation.

$$CR=Tp/Tc$$

Contrast ratio (CR) of the display was calculated with the following equation.

$$CR=\text{maximum luminance/minimum luminance}$$

EXPLANATION OF NUMERICAL SYMBOLS

10: thin high-performance polarizing film
11: resin substrate
12: PVA type resin layer
13: laminate film
14: dyeing solution comprising a dichroic material 14'
15: boric acid solution
16: roll type stretching apparatus having a plurality of pairs of rolls driven with different peripheral speeds
(A) manufacturing process of a laminate film including a resin substrate and a PVA type resin layer
(B) dyeing process
(C) cross-linking process
(D) stretching process
(E) cross-linking process before dyeing process
(F) cross-linking process before stretching process (D)
(G) cleaning process
(H) drying process
(I) transferring process

The invention claimed is:

1. A method for manufacturing a thin high-performance polarizing film having a thickness of 7 μm or less and comprising a polyvinyl alcohol type resin having a dichroic material impregnated therein in a molecularly oriented state, the method comprising steps of:
   coating a polyvinyl alcohol type resin on a resin substrate having a thickness of at least 20 μm and then drying the polyvinyl alcohol type resin to thereby form a polyvinyl alcohol type resin layer on said resin substrate;
   immersing thus produced polyvinyl alcohol type resin layer in a dyeing solution of a dichroic material to thereby impregnate the dichroic material in the polyvinyl alcohol type resin layer; and
   following the immersing step stretching the polyvinyl alcohol type resin layer having the dichroic material impregnated therein together with the resin substrate in a boric acid solution under a temperature not higher than 65° C. such that a total stretching ratio of 5.0 or more with respect to an original length is achieved.

2. A method as defined by claim 1, wherein the polyvinyl alcohol type resin layer is subjected to a preliminary insolubilization treatment when the polyvinyl alcohol type resin layer produced on the resin substrate is immersed in the dyeing solution of the dichroic material.

3. A method as defined by claim 2, wherein the insolubilization of the polyvinyl alcohol type resin layer is carried out by immersing the polyvinyl alcohol type resin layer in the boric acid solution.

4. A method as defined by claim 3, further comprising a step of attaching the optically functional film via a bonding agent to the thin high-performance polarizing film at a surface opposite to the surface which is attached to one surface of the stretched resin substrate film included in the dried laminate film.

5. A method as defined by claim 1, wherein the polyvinyl alcohol type resin layer is immersed for 5 to 60 seconds in the dyeing solution which contains 0.1 wt % to 4.5 wt % of the dichroic material to thereby impregnate the dichroic material therein.

6. A method as defined by claim 1, wherein the polyvinyl type resin layer having the dichroic material impregnated therein is stretched together with the resin substrate in the boric acid solution at a temperature lower than the glass-transition temperature of the resin substrate.

7. A method as defined by claim 1, wherein both of the dyeing solution which contains the dichroic material comprising iodine for immersing the polyvinyl alcohol type resin layer produced on the resin substrate, and the boric acid solution for stretching the polyvinyl alcohol type resin layer having iodine impregnated therein as the dichroic material integrally with the resin substrate further contain iodide salt.

8. A method as defined by claim 1, wherein a transparent substrate is used as the resin substrate to thereby form an optically functional film comprising the transparent substrate on one surface.

9. A method as defined by claim 1, further including steps of attaching another resin film via a bonding agent to the thin high-performance polarizing film at a surface opposite to the surface which is attached to the resin substrate formed therewith, while simultaneously peeling the resin substrate from the thin high-performance polarizing film to transfer the thin high-performance polarizing film to the another resin film for forming an optically functional film comprising the transferred resin film on one surface thereof.

10. A method as defined by claim 9, wherein a second optically functional film is attached via a bonding agent to the thin high-performance polarizing film at a surface opposite to the surface which is attached to the optically functional film to thereby form a thin high-performance polarizing film having the optically functional film on both surfaces.

11. A method for manufacturing a laminate film including a thin high-performance polarizing film having a dichroic material impregnated therein in a molecularly oriented state, the method comprising steps of:
    manufacturing a laminate film including a resin substrate having a thickness of at least 20 μm and a polyvinyl alcohol type resin layer formed by coating a solution comprising a polyvinyl alcohol type resin on one of the opposite surfaces of the resin substrate and then drying;
    immersing the laminate film including the resin substrate and the polyvinyl alcohol type resin layer formed on one of the surfaces of the resin substrate in a dyeing solution containing a dichroic material to thereby impregnate the dichroic material in the polyvinyl alcohol type resin layer in the laminate film;
    following the immersing step, stretching the laminate film including the polyvinyl alcohol type resin layer having the dichroic material impregnated therein, in a boric acid solution under a temperature not higher than 65° C. to achieve a total stretching ratio of 5.0 or more with respect to an original length; and
    stretching the polyvinyl alcohol type resin layer having the dichroic material impregnated therein together with the resin substrate to produce a laminate film including a thin high-performance polarizing film having a thickness of 7 μm or less and comprising the polyvinyl alcohol type resin layer having the dichroic material impregnated therein in a molecularly oriented state on one surface of the resin substrate.

12. A method as defined by claim 11, wherein the polyvinyl alcohol type resin layer included in the laminate film is subjected to a preliminary insolubilization treatment before immersing the laminate film including the resin substrate and the polyvinyl alcohol type resin layer formed on one of the surfaces of the resin substrate in a dyeing solution.

13. A method as defined by claim 11, wherein the insolubilization treatment of the polyvinyl alcohol type resin layer included in the laminate film is carried out by immersing the polyvinyl alcohol type resin layer in the boric acid solution to have the polyvinyl alcohol type resin layer insolubilized.

14. A method as defined by claim 11, wherein the polyvinyl alcohol type resin layer included in the laminate film having the dichroic material impregnated therein is stretched together with the laminate film in the boric acid solution under a temperature lower than the glass-transition temperature of the resin substrate included in the laminate film.

15. A method as defined by claim 11, wherein a transparent resin is used as the resin substrate included in the laminate film.

16. A method as defined by claim 11, wherein the laminate film is immersed for 5 to 60 seconds in the dyeing solution which contains 0.1 wt % to 4.5 wt % of the dichroic material to thereby impregnate the dichroic material in the polyvinyl alcohol resin layer included in the laminate film.

17. A method as defined by claim 11, wherein both of the dyeing solution which contains the dichroic material comprising iodine for immersing the laminate film including the polyvinyl alcohol type resin layer produced on the resin substrate and the boric acid solution for stretching the polyvinyl alcohol type resin layer having iodine impregnated therein as the dichroic material together with the resin substrate further contain iodide salt.

18. A method as defined by claim 11, further comprising a process of cleaning the laminate film including the thin high-performance polarizing film comprising the polyvinyl alcohol type resin having the dichroic material impregnated therein in a molecularly oriented state, with a solution containing iodide salt and having a temperature lower than the glass-transition temperature of the resin substrate included in the film laminate.

19. A method as defined by claim 18, further comprising a step of drying the cleaned laminate film under a temperature from 50° C. to 100° C.

* * * * *